Figure 10:
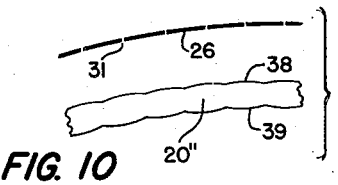

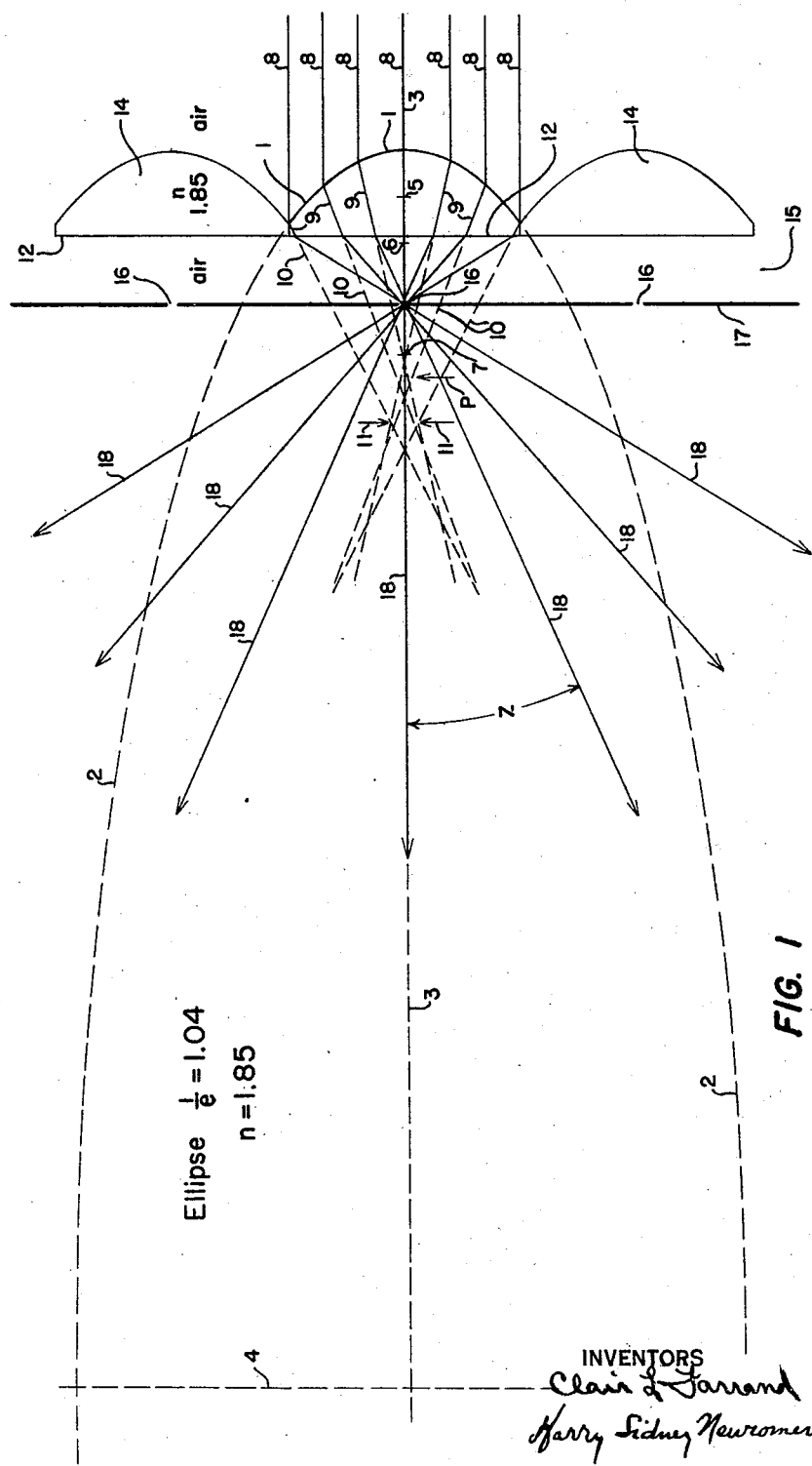

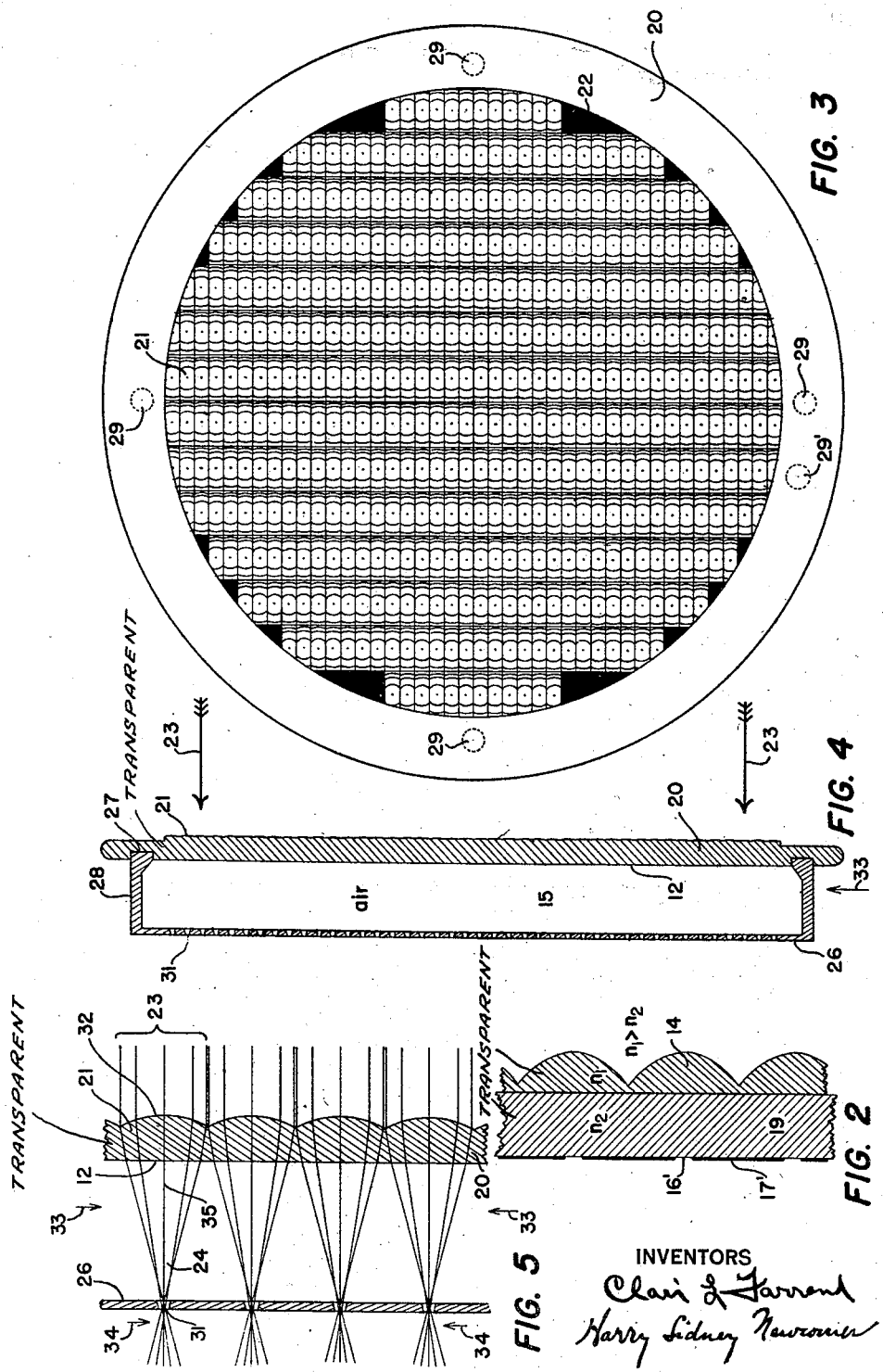

June 16, 1942.  C. L. FARRAND ET AL  2,286,201
OPAQUE APERTURED SIGNAL LENS
Filed April 5, 1939   3 Sheets-Sheet 3

INVENTORS
Clair L. Farrand
Harry Sidney Newcomer

Patented June 16, 1942

2,286,201

UNITED STATES PATENT OFFICE 2,286,201

OPAQUE APERTURED SIGNAL LENS

Clair L. Farrand, Larchmont, and Harry Sidney Newcomer, New York, N. Y.

Application April 5, 1939, Serial No. 266,102

10 Claims. (Cl. 177—329)

This invention relates to improvements in multiple refracting element back projection specular screens, and to screens for lamp houses wherein light from a source is adapted to be projected at certain times and throughout a predetermined area, such as for example, railway signal and traffic control lights. It provides means for accomplishing decrease in the thickness and weight of such screens in which a light receiving device projects light into the apertures of an opaque, apertured screen and at the same time distributes said light throughout a given solid angle to the other side of the opaque apertured screen. Other advantages deriving from the invention provide important improvements over the prior art, as will be evidenced by a study of the descriptive matter which follows.

Railway and traffic control light signals are often of the type which make use of colored filters and which depend for their indication upon appearing alternately either luminous or dark.

Great difficulty has been experienced with this type of signal due to sunlight, light from headlights or other intense sources so illuminating the signal that it is difficult, and some times impossible, to tell whether or not the signal is energized or dark. When they appear luminous without being energized, this has been termed "phantom indication."

This phantom indication is particularly troublesome in the case of sunlight in the early morning or late afternoon, when the incident rays of the sun are nearly normal to the signal lens and are reflected to the observer much in the same manner and intensity as light from the illuminating source itself.

In the case of traffic or railway control signals such as are now used, consisting of red, orange and green lights, at these times all three signals appear to be illuminated and traffic control is disrupted.

In the case of position light signals as used on railways, at these times all lights appear to be illuminated and signalling is disrupted.

Attempts have been made to remedy this trouble by various means, including the insertion of cellular screens which limit the angle through which incident light may fall on the signal in such a way as to be reflected. These means have improved the situation only in part and do not reduce the phantom indication to a negligible minimum, as the present invention provides.

By this invention we have provided a novel form of lens screen which prevents the reflection of sunlight or light originating in outside intense sources from being reflected by the signal in a manner or extent similar to a signal indication.

This invention relates to certain improvements in the devices described in an application by H. Sidney Newcomer filed April 5, 1939, Serial No. 266,101. Particularly it permits of almost complete correction of that aberration of the equiflux ellipses therein described which is of the nature of a hyperspherical aberration correction. It thus permits, when using axially incident light, of greatly reduced size of the apertures in the screen. For this reason and in addition because of the peculiar aperture conditions found in certain embodiments of the invention, it further reduces the already nearly negligible front screen surface reflections or phantoming such as is found in the devices described in said copending application.

The invention provides, as one particular and important application of the said improvements, a practical and effective means of constructing railroad and other traffic signal lights so as to prevent phantoming, increase luminosity and precisely and completely delimit the spread of the signal beam.

Other advantages of general application of certain embodiments of this invention are to be found in protection of the front surface of the refracting elements and in a permissible great decrease in thickness of the refracting elements which, besides other advantages, makes possible the use of glasses or other optical materials of very high index, thus increasing the practical range of indices available in design and materially extending the angles throughout which substantially constant light flux values are obtainable with ellipsoidal surfaces.

The invention also permits the use of sheets of plastic, light in weight and mechanically strong, as a support for the assembly of refracting elements, while at the same time retaining many of the aforementioned advantages.

Figure 11:
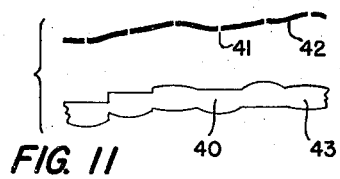
Figure 6:
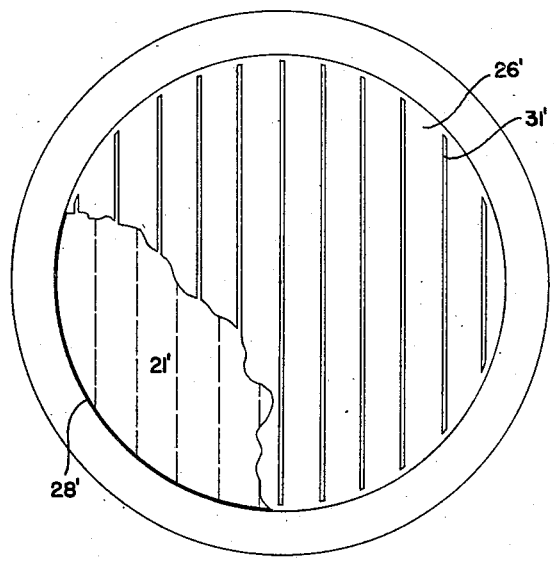
Figure 7:
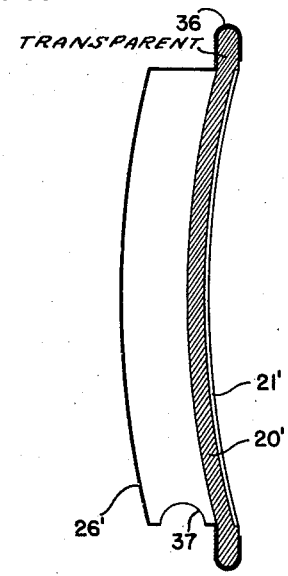
Figure 8:
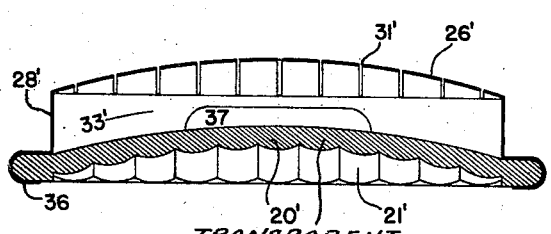
Figure 12:
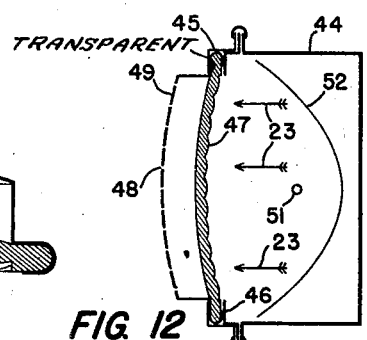
Figure 9:
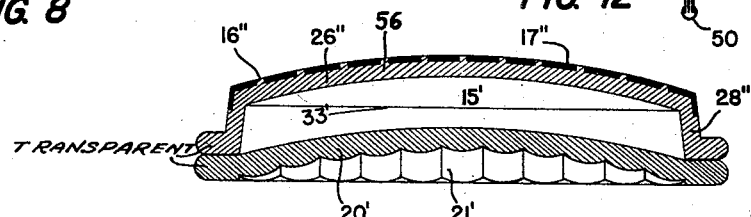

The objects and nature of the invention will be better understood by reference to the accompanying drawings, in which:

Fig. 1 represents in section the light ray paths for one of an assembly of ellipsoidal refracting elements arranged in accordance with this invention wherein they are separated by an air space from an opaque apertured screen, and, Fig. 2 is another such assembly of elements in which the separating medium is not air, and, Fig. 3 is a back elevation of an assembly of refracting elements according to the invention, arranged to form a traffic light roundel, and, Fig. 4 is a section of the same, showing in addition an opaque apertured screen separated, according to the invention, from the assembly of light receiving elements by an air space, and, Fig. 5 is a schematic diagram of the light paths in a horizontal plan section, showing the relationship of the refracting elements to the air space and the opaque apertured screen, and Fig. 6 is a front elevation of one embodiment of the invention in which a traffic light roundel having multiple cylindrical elements is assembled in combination with an opaque linearly apertured screen to form a traffic light roundel screen assembly, and Fig. 7 is a vertical meridian section of such a traffic light roundel screen assembly, and Fig. 8 is a section in the horizontal plane of such a traffic light roundel screen assembly with the lower half removed, and Fig. 9 is a similar view of a modification of such a traffic light roundel screen assembly in which by a modification of the arrangement of Fig. 2 the opaque screen is supported on a transparent base, and Fig. 10 shows a modification of an assembly of refracting elements and associated opaque apertured screen in which the convergence effect of the individual elements is divided between both surfaces, and Fig. 11 shows a further modification in which a step like arrangement of the refracting elements and/or screen apertures with discontinuity of screen surface is provided, and Fig. 12 shows schematically in section a signal lamp house embodying the invention.

In Fig. 1, 1 is a portion adjacent to the vertex of an ellipse 2 having a major axis 3 and a minor axis 4. 5 is the geometrical focus of the ellipse, in this example an ellipse of reciprocal numerical eccentricity $$\frac{1}{e} = 1.04$$

6 is the center of radius of curvature of the vertex of the ellipse. If the medium enveloped by the ellipse had an index of refraction $n=1.85$, then 7 would be the paraxial focal point in said medium and rays 8 incident on the ellipse parallel to the axis 3 would be refracted along paths 9 and 10 with a hypercorrection for spherical aberration so as to be most restricted in cross section at the position of the arrows 11. The arrows 11 are situated substantially further from the vertex than the focal point 7. These arrows would then be a suitable location for a stop and an exit plane having minimal area as described in the above mentioned Newcomer application. The ellipse of this example is so chosen, as described in said application, as to give substantially uniform light flux along rays refracted at exit at such a plane. In this example the light flux remains substantially constant up to maximum exit or zenith angle $z$ of about 58°. In the example of Fig. 1, and in accordance with this invention, the thickness of the refracting elements with converging surface 1 is made substantially less than the distance from the vertex to the point of the imaginary stop 11. In this example, the thickness of the refracting element is made only sufficient to include the necessary arc of the ellipse, so that the element takes the form shown as bounded by the vertex surface 1 and the plane 12. To each side of the element so bounded are shown like neighboring elements 14. The rays 9 are refracted at the surface 12 as the rays 18.

They make the same zenith angles $z$ with the axis 3 as they would have made if refracted at a plane exit surface placed normal to the axis 3 at 11 instead of at 12. However, after traversing the air space 15 they now come substantially to a focus at a point 16 at which has been placed an aperture 16 of an opaque screen 17.

Thus as a result of diminishing the thickness of the ellipsoidal element to a minimum and introducing an air space, the distance to the opaque apertured screen, that is the total thickness of the device, has been much decreased and the size of an aperture necessary to pass rays incident parallel to the axis has been much decreased.

Moreover it will be seen that light incident from the reverse direction, i. e. from the left in Fig. 1, if falling on a plane glass surface at 11, would be reflected in proportion to the area of the opening indicated in position and size by arrows 11. On the other hand, light so falling on the aperture 16 will not only meet a smaller opening but will traverse it and pass into the air space 15 and not be reflected until it strikes the surface 12. The opportunity for a chance beam so falling on the surface 12 to again find an exit opening 16 is very slight. The phantom effect of the device has thus been very materially reduced from even that small amount present in the alternative device described in the aforesaid copending application.

Where it is desirable, in order to secure uniform light flux over an extended range of zenith angles, to use an optical material of very high index, as in this example of Fig. 1, the reduced thickness of refracting element there secured is a great advantage. In order to assemble such refracting elements, it may be desirable to hold them in contact at their face 12 with a refracting material of smaller index than that of the refracting element. This material could at the same time be a so-called plastic supporting medium such as are available having great strength and toughness as well as other desirable physical and optical properties. If in Fig. 1 such a medium, for example of index 1.5, were placed in contact with the surface 12 and made sufficiently thick to permit the opaque screen being applied to its other surface and be thus positioned at a distance such that the rays are concentrated to have a minimum cross sectional area at an aperture on the other face thereof, then in the figure said aperture and surface should be at the position of the arrow P. The arrow P also indicates, by its position, the necessary size of the aperture for such an arrangement.

Fig. 2 shows schematically such an arrangement, in which elements 14 of index $n_1$, as in Fig. 1, are applied to a plane sheet 19 of optical material of smaller refractive index $n_2$, in this case index 1.5. These elements may have either a high or a low index of refraction. An opaque apertured screen 17' is applied to the other surface of the medium 19. The screen has apertures 16', somewhat larger than the apertures 16 of Fig. 1. Fig. 2 is drawn to half the scale of Fig. 1 and shows, by way of example the same ellipsoidal elements applied to a medium of smaller refractive index than themselves but greater than air. In Fig. 1 the plane of the screen 17' would have been at P.

It is not necessary, according to the invention, that the optical material 19 be thick enough to reach to and bear the screen 17'. An air space might still intervene between it and the screen, it serving then merely to support the refractive elements 14 of the assembly.

One of the applications of this invention is to traffic and railroad crossing signals, where phantoming should, if possible, be avoided and where the angular distribution of light flux needs to be limited to a given angular field, both to avoid false signals and to increase the strength of the signal by confining all the available light to a narrow beam. The beam is indeed usually desired so narrow as to require the utilized portion of the ellipsoid or other refracting surface to be relatively restricted. Therefore, in order to keep the absolute size of such a portion of an ellipsoid to within reasonable dimensions, it is necessary to use elements whose axial length, when designed as in said copending application, are quite great. This tends to make the glass thickness great, indeed inconveniently so. As has been seen, the present invention overcomes this difficulty, besides giving other advantages.

In Fig. 3 there is shown a back elevation of a multiple element refracting screen according to the invention for use as a roundel in a signal lamp house. The roundel 20 may be placed in the lamp house in place of the usual colored roundel. It may be backed by a roundel of colored glass or it may be made in whole or part of colored glass itself. The conventional lamp house is usually provided with a parabolic mirror and lamp at its focus so as to throw a collimated beam normal to the face of the roundel.

In a device according to the invention, the back surface of the roundel is covered, over its utilized area, with a multiplicity of refracting elements 21 which in this particular example are wider than they are high and so chosen, as fully set forth in said copending application, as to limit the total angular distribution of the transmitted light, in this example, to 30 degrees in the horizontal and 10 degrees in the vertical. The arrangement or patterning of the assembly of refracting elements may be in rows as drawn, or they may be staggered or given any other desired pattern. In the example, if some of the areas are too small for the convenient or useful placing of refracting elements, they may be blacked out, as at 22.

In Fig. 4, which is a vertical section through the roundel of Fig. 3 and associated screen, there is shown at 20 a meridian vertical section of the roundel 20 of Fig. 3. Light is incident on its perpendicular to its surface as indicated by the arrows 23. The light is refracted by the elements 21 at their curved receiving surfaces and again at their common plane surface 12, and then traverses the air space to substantially focus in apertures 31 of the opaque screen 26. the screen 26, each aperture 31 corresponds to an oppositely situated element 21. The apertures may be accurately located, as is obvious, by accuracy of design, or they may be located photographically, as described by Cristiani et al. in British Patent No. 421,231. The screen 26 may be maintained in correct orientation or alignment and at a correct distance with respect to the refracting element assembly or roundel by means of dowels 27 in the enclosing rim 28. Said dowels may fit into holes in the roundel, as shown at 29 in Fig. 3. An asymmetrically placed hole 29', or other means, serves to fix the orientation of the screen.

In Fig. 5 there is shown, enlarged two times as compared with Fig. 4, a horizontal section through a portion of the light receiving device and screen. The device of Fig. 4 and that of Fig. 2 corresponds in certain respects. In the latter, for the same absolute size of element, the total thickness, element to screen, is less because the angular dispersion is very much greater, in fact that described for Fig. 1. In Fig. 5, 21 is drawn as a refracting element of index 1.50 with light converging surface 32 and plane surface 12. It might be an ellipsoidal surface having the properties described in said copending application. As drawn it is a spherical surface having its center of curvature in the plane of the arrows 33 of Figs. 5 and 4. The paraxial focal point for the incident light beam 23 is in the plane of the arrows 34. The narrowest place in the refracted light cone 24 is proximal to this in the plane of the opaque apertured screen 26. 31 is the aperture passing said cone of light 24. The extent of the circle segment 32 is chosen, in this example, such as to make the maximum zenith angle for the (outside) refracted ray approximately 15 degrees. Along this ray the light flux is about 75% of the axial flux. It could be made more like the central flux by means disclosed in said copending application. The zenith angle is here so limited however, (even more so in the vertical meridian) as to make it possible to choose a spherical surface with no more light loss than the above. If this be too much light loss, recourse may be had to ellipsoidal surfaces as in said copending application and as exemplified in Figs. 1 and 2. Indeed a suitable converging surface giving uniform light flux would be an ellipsoid of index 1.50 formed by revolution about its major axis 35 of an ellipse of reciprocal numerical eccentricity 1.12 (or even less) having the center of curvature of the vertex point in the plane of the arrows 33. Such an ellipse segment, when drawn superimposed over the circle segment would be hardly distinguishable from it. The surface 32 may thus be considered as representing either construction.

The assembly of refracting elements 20 (Figs. 3, 4 and 5) may be moulded in one piece as shown, or thin elements may be adhered to a supporting base, as at 14 and 19 in Fig. 2. In the latter case the base 19 may be sufficiently thick to also support the screen as at 17', Fig. 2. Or it may be thin and of the same or different index from the light converging elements so that 14 and 19 (without 17') substitute for 20, Fig. 5, the curvature of 14 being such then as to converge the light to a screen aperture lying beyond the free surface of the supporting medium 19, as at 26, Fig. 5, or both the refracting elements and the screen may be supported each on a base of transparent material and an air space may be left between, or other suitable means may be chosen.

As disclosed in said copending application, the extent or numerical opening of the converging surface will govern, in so far as it is limited in the different meridians, a corresponding extent of zenith angle distribution of the transmitted light. This will thus also to a certain extent govern the pattern of the refracting element assembly. The absolute size of the individual refracting elements will be governed by the closeness of the aperture pattern which may be required and as the element size decreases, by the difficulties attendant on their material realization.

Simplicity of design and facility of construction and registration of the refracting elements in relation to the apertured screen may, we have discovered, be accomplished without loss of many of the advantages of the invention by using an assembly of surfaces refracting in one plane only, i. e. cylindrical surfaces, together with a screen bearing corresponding linear apertures. Such an arrangement may have for some purposes advantages, including advantages of construction, over these lenticulated in two meridians.

Such an embodiment of the invention is illustrated in Fig. 6 where the opaque screen 26' is shown with linear apertures 31'. A portion of the opaque screen is shown cut away to show an outline of cylindrical elements 21', seen through the transparent refractory material in which they are formed. At 28' is seen the edge of the enclosing rim (as at 28 in Fig. 4).

Fig. 7 shows a substantially meridianal vertical section of the device of Fig. 6, 26' being the opaque screen applied to the transparent roundel 20' with one of its cylindrical or toric surfaces shown at 21'. The whole is also given a curvature in the vertical meridian so as to obviate objectional reflections from the front surface of 26', reflections which might be significant even if the surface 26' were comparatively black. The curvature of the roundel 20', in the vertical meridian, may be such as to provide for some slight and suitable vertical dispersion of the beam.

At 36 the screen 26' of metal or other suitable material is shown clamped around the edge of the roundel 20'. At 37 is shown, somewhat out of plane with the rest of the section, a cut out of the screen rim to allow egress for water and snow entering by the slits 31'. (Fig. 6.)

Fig. 8 shows in horizontal section the upper half of the roundel assembly of Fig. 6. At 20' is the roundel of curved form (curved to avoid reflection) bearing the cylindrical or toric refracting surfaces 21'. In the example these have a transverse circular section with centers of the circles in the locus 33'. A beam of light incident on the back surface of the roundel parallel to the axis of the lamp housing and roundel assembly, as shown at 23 Fig. 12, that is incident normal to the plane of the edge of the roundel as at 36, Fig. 8, is refracted by the cylinders to form beams showing some spherical aberration and coma but having a smallest cross section, or effective foci, at points readily located by calculation or by geometrical construction to be in the surface 26' at the slit areas 31' as drawn. The curvature of 26' comes out, in this example, to be somewhat different from and less than that of the roundel 20'. The curvature or amount of dishing of the screen 26' and the curvature or amount of dishing of the roundel 20' need not necessarily be the same or the same in both meridians.

At 36, Fig. 8, we show the rim of the screen 26' bent around the roundel 20' to clamp it to it. At 37 we show the opening of the rim for egress of water and snow.

In Fig. 9 we show in section, and partly in elevation, a modification of the screen assembly of Fig. 8 in which the roundel 20', bearing the cylindrical or toric refraction surfaces 21', is associated with a linearly apertured screen 26'' comprising a roundel of transparent material 56 to which are applied opaque bars 17'' leaving clear areas 16''. The rim 28'' of the roundel 56 is arranged to suitably center and orient it with respect to the roundel 20'. In the figure the space 15' is air and of such dimension, in relation to the other dimensions concerned, as to bring the apertures 16'' to the position substantially at the most constricted portions of the refracted beams, as heretofore set forth. The roundel 20' and the screen plate cover 26'', one or either, or both, may be of glass or transparent moldable plastic. The opaque areas 17'' may be of plastic or paint or other suitable material.

There is no necessity, in opaque apertured screen and multiple refractive element assemblies, as for example described in the above traffic light roundel screen assemblies, that the principal converging surface of the individual elements be formed on one surface only of the assembly or be restricted to the surface facing the incident light beam and away from the opaque apertured screen.

The principal converging surface might also be on the side facing the opaque apertured screen, or the convergence might be divided between the two surfaces, both being convex, or any other conventional arrangement for the two surfaces of a convergent lens might be adopted.

In Fig. 10 we show a portion of a cross section of doubly convex elements comprising an assembly 20'' of refracting elements similar to the roundels 20' of Figs. 8 and 9 or the assembly 20 of Fig. 5, etc. The ellipsoidal, spherical, cylindrical, toric or other curved formed elements each have two convex surfaces 38 and 39. The elements have effective foci in the apertures 31 of the opaque screen 26.

The refracting elements thus far described or depicted lie tangent to a common surface, in some instances plane, in some instances curved, and the corresponding opaque apertured screen likewise has its apertures in a common plane or curved surface, but any requirement for such continuity as contrasted with discontinuity in arrangement is obviously not necessary, and indeed discontinuity, as in Fig. 11, may be desirable. Here the refracting elements 40 and their corresponding apertures 41 are given a step like arrangement in order to break up and increase the discontinuity of the opaque apertured surface 42. This latter might also be secured by differences in focal length of the screen elements 40, as at 43.

By way of illustration, we show in Fig. 12, in horizontal section, a conventional traffic or signal lamp house provided with an opaque apertured screen and cooperating lens in accordance with this invention. The nature of the arrangement will be apparent by virtue of the exposition of the invention as above set forth. Thus at 44 there is a casing having a cover or door 46, to which is clamped by means of the retaining ring 45, a lens roundel and screen assembly as described, comprising an assembly of refractive elements 47 and corresponding apertures 48 of the opaque screen 49. The retaining ring 45 and cover 46 are attached or hinged to the casing by suitable means, as indicated at 50. The filament 51 is placed at the focus of the parabolic mirror 52 and supplies a beam of substantially parallel light as indicated by the arrows 23 to the refracting elements 47. The filament 51 is preferably arranged with its length parallel to the major dimensions of the aperture 48.

The foregoing particular embodiments described are illustrative merely and not intended as defining the limits, either of execution or application of the invention.

We claim:

1. A signal lamp comprising a light source, a collimator, a plate of convergent lenses of index $n$ arranged side by side, and an apertured plate of opaque material, all successively arranged in the order named; the light apertures of said plate being of such magnitude and so disposed with respect to the axes of said lenses as to accommodate the smallest cross-section of the cones of rays of light from the collimated source focussed by the lenses, said apertured plate having a light absorbent front surface being separated from the plate of lenses by a medium of index substantially less than $n$, whereby the viewing surface of the said signal lamp presents a maximum opacity and low reflectivity to incident light, yet freely passes the light from said source with minimum impediment.

2. A signal lamp as in claim 1 in which the lenses have a plane front surface and an ellipsoidal back surface with long axis of the ellipsoid normal to the plane surface, the reciprocal eccentricity of the ellipse being substantially less than $n$.

3. A signal lens as in claim 1 in which the lenses have a plane front surface and an ellipsoidal back surface with long axis of the ellipse normal to the plane surface, the reciprocal eccentricity of the ellipse being substantially less than $n$, the medium separating the lenses and the light apertured plate being air.

4. A signal lamp as in claim 1, in which the lenses are formed on a dished glass signal roundel, and in which the separating transparent medium of index less than $n$ is a solid medium having its front and back surfaces dished so that mutual contact is maintained substantially throughout the adjacent surfaces of said roundel and the solid medium.

5. A signal lamp as in claim 1, in which the apertured plate and the lens plate are in mutual contact throughout substantially all of their adjacent surfaces.

6. A signal lamp as in claim 1, in which the lenses are formed on a dished glass signal roundel, and in which the apertured plate is formed in metal and provided with a rim which is fixed to the rim of the lens plate.

7. A signal lamp as in claim 1, in which the lenses are formed on a dished glass signal roundel, and in which the separating transparent medium of index less than $n$ is a solid medium having its front and back surfaces dished so that mutual contact is maintained substantially throughout the adjacent surfaces of said roundel and the solid medium; and, in which the apertured plate is formed of metal and is provided with a rim which is fixed to the transparent medium and lens plate.

8. A signal lamp as in claim 1, in which the lenses are formed on a dished glass signal roundel, in which the separating transparent medium of index less than $n$ is a solid medium, and in which the apertured plate is formed in metal and provided with a rim which is fixed to the rim of the lens plate, the apertured plate and the lens plate being in contact throughout substantially all of their adjacent surfaces with the solid medium.

9. A signal lamp as in claim 1, in which the lenses are formed on a dished glass signal roundel, and in which the apertured plate is constructed of glass of corresponding shape with a rim contacting the lens plate and in which the apertures are formed by impregnating appropriate recessed areas of the front surface of the apertured plate with opaque material.

10. A signal lamp as in claim 1, in which the lenses are formed on a dished glass signal roundel, and in which the apertured plate is constructed of glass of corresponding shape, the apertured plate and the lens plate being in contact throughout substantially all of their adjacent surfaces, and in which the apertures are formed by impregnating appropriate recessed areas of the front surface of the apertured plate with opaque material.

CLAIR L. FARRAND.
HARRY SIDNEY NEWCOMER.